(12) United States Patent
Huberman

(10) Patent No.: US 10,634,505 B1
(45) Date of Patent: Apr. 28, 2020

(54) METHOD AND SYSTEM FOR THRESHOLD-BASED DETECTION OF DISTORTIVE MAGNETIC FIELDS IN INDOOR LOCATIONS

(71) Applicant: MAPSTED CORP., Mississauga (CA)

(72) Inventor: Sean Huberman, Guelph (CA)

(73) Assignee: MAPSTED CORP., Mississauga, Ontario (CA)

( * ) Notice: Subject to any disclaimer, the term of this patent is extended or adjusted under 35 U.S.C. 154(b) by 0 days.

(21) Appl. No.: 16/269,772

(22) Filed: Feb. 7, 2019

(51) Int. Cl.
*H04W 4/029* (2018.01)
*G01C 21/20* (2006.01)
*G01C 21/16* (2006.01)
*H04W 4/33* (2018.01)

(52) U.S. Cl.
CPC ............ *G01C 21/206* (2013.01); *G01C 21/16* (2013.01); *H04W 4/029* (2018.02); *H04W 4/33* (2018.02)

(58) Field of Classification Search
CPC ...... H04W 4/33; H04W 4/029; G01C 21/206; G01C 21/16; G01C 21/08
See application file for complete search history.

(56) References Cited

U.S. PATENT DOCUMENTS

| | | | |
|---|---|---|---|
| 6,539,327 B1 | 3/2003 | Dassot et al. | |
| 9,170,112 B2 | 10/2015 | Mirov et al. | |
| 9,557,178 B2 | 1/2017 | Ghose et al. | |
| 2009/0043504 A1 | 2/2009 | Bandyopadhyay et al. | |
| 2013/0150076 A1 | 6/2013 | Kim et al. | |
| 2014/0180627 A1 | 6/2014 | Naguib et al. | |
| 2015/0018018 A1 | 1/2015 | Shen et al. | |
| 2016/0011022 A1 | 1/2016 | Zheng et al. | |
| 2016/0379074 A1 | 12/2016 | Nielsen et al. | |
| 2017/0265041 A1 | 9/2017 | Mahasenan et al. | |
| 2018/0257688 A1* | 9/2018 | Carter | G01R 33/072 |
| 2018/0356475 A1* | 12/2018 | Eitel | G01R 33/0206 |

* cited by examiner

*Primary Examiner* — Said M Elnoubi
(74) *Attorney, Agent, or Firm* — Henry L. Ohab

(57) ABSTRACT

A method and system of localizing a mobile device having a processor and a memory. The method comprises localizing the mobile device, using the processor and the memory, along a sequence of positions describing a route being traversed in an indoor facility based on a set of data fusion inputs, detecting, based on magnetic field data of a magnetic field sensor device coupled to the processor, one or more outlier magnetic parameters in accordance with at least one magnetic parameter threshold, and upon establishing existence of a magnetic distortion field based upon the one or more outlier magnetic parameters, switching to a mobile device transition localization mode.

18 Claims, 3 Drawing Sheets

300

Localizing a mobile device having a processor and a memory along a sequence of positions describing a route being traversed in an indoor facility based on a set of data fusion inputs
310

Detecting, based on magnetic field data of a magnetic field sensor device coupled to the processor of the mobile device, one or more outlier magnetic parameters in accordance with at least one magnetic parameter threshold
320

Upon establishing existence of a magnetic distortion field based upon the one or more outlier magnetic parameters, switching to a mobile device transition localization mode
330

300

Localizing a mobile device having a processor and a memory along a sequence of positions describing a route being traversed in an indoor facility based on a set of data fusion inputs
310

Detecting, based on magnetic field data of a magnetic field sensor device coupled to the processor of the mobile device, one or more outlier magnetic parameters in accordance with at least one magnetic parameter threshold
320

Upon establishing existence of a magnetic distortion field based upon the one or more outlier magnetic parameters, switching to a mobile device transition localization mode
330

FIG. 3

METHOD AND SYSTEM FOR THRESHOLD-BASED DETECTION OF DISTORTIVE MAGNETIC FIELDS IN INDOOR LOCATIONS

TECHNICAL FIELD

The disclosure herein relates to the field of mobile device navigation and positioning.

BACKGROUND

Users of mobile devices, including smartphones, tablets and wearable computing devices, are increasingly using and depending upon indoor positioning and navigation applications and features. Seamless, accurate and dependable indoor positioning of a mobile device as carried or worn by a user can be difficult to achieve using satellite-based navigation systems when the latter becomes unavailable, or sporadically available, and therefore unreliable, such as within enclosed or partially enclosed urban infrastructure and buildings, including hospitals, shopping malls, airports, universities and industrial warehouses. Wireless communication signal data, ambient barometric data, mobile device inertial data and magnetic field data may be measured applied in localizing a mobile device along a route traversed within indoor infrastructure. When a distorted magnetic field is encountered during indoor route traversal, continued usage of magnetic field data may produce inconsistent and unreliable mobile device localization results for the indoor locations.

BRIEF DESCRIPTION OF THE DRAWINGS

FIG. 3 illustrates, in an example embodiment, a method of localizing a mobile device in a distorted magnetic field.

DETAILED DESCRIPTION

Figure 1:
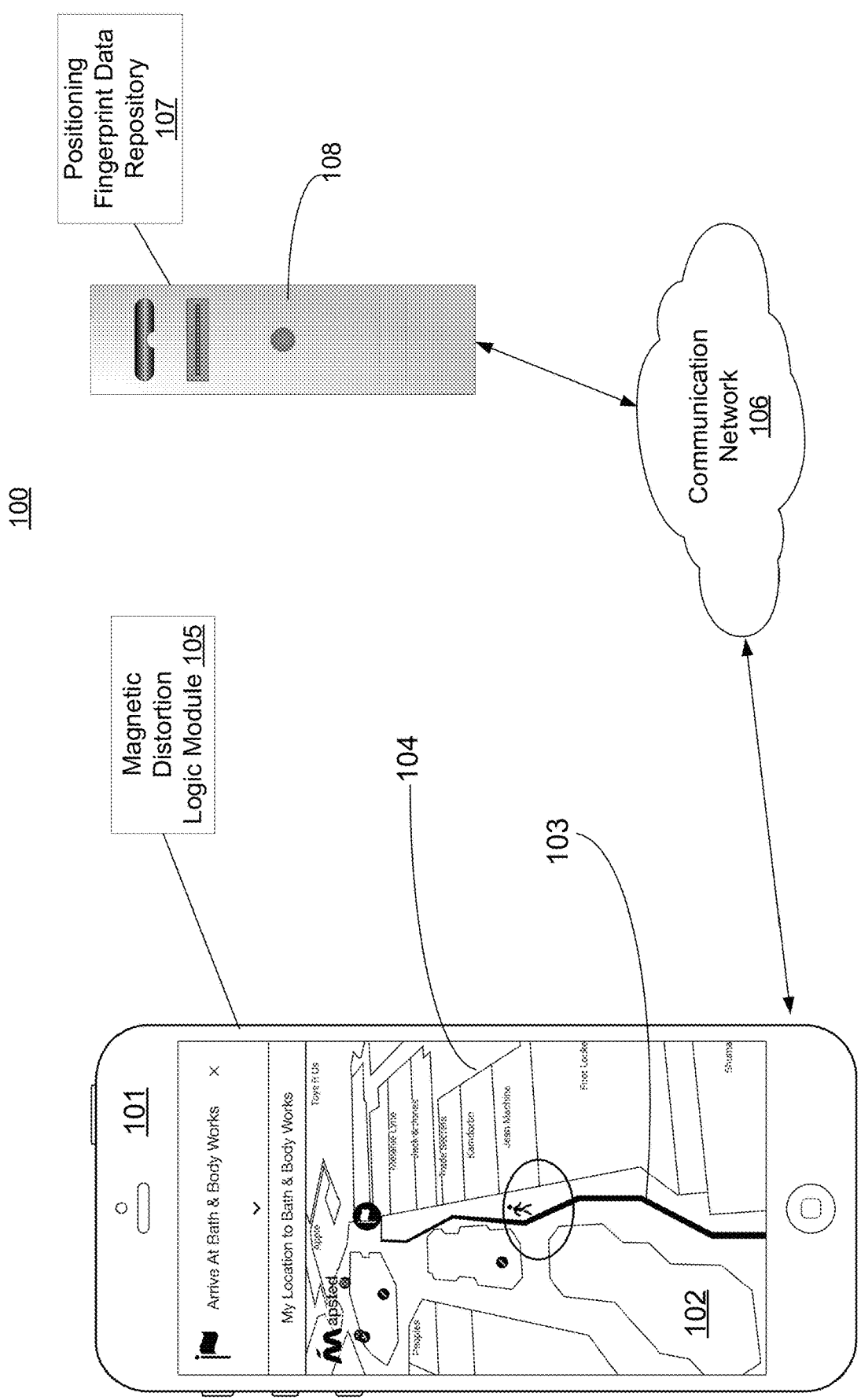
FIG. 1 illustrates, in an example embodiment, a system for localizing a mobile device in a magnetic field.

Embodiments herein recognize that mobile devices used for indoor navigation must perform with a degree of accuracy and responsiveness that meets or exceeds user expectations. Among other technical effects and advantages, embodiments herein provide solutions which are directed to using indoor navigation solutions in a manner that enhances accuracy of positioning determination, referred to herein as localization, with accuracy and responsiveness based upon detecting distortive or potentially distortive magnetic fields. Embodiments herein also recognize that, among the various data inputs to user indoor navigation and positioning, such as wireless signal data, inertial data, magnetic data, barometric, and optical line of sight data, magnetic field data acquired in the presence of a magnetic field may be sufficiently distortive to produce inaccurate mobile device localization results, unless existence of the distorting field is timely detected and taken into consideration.

Embodiments herein provide a method for localizing a mobile device having a processor and a memory, based on detecting presence of a distorted magnetic field. In particular, the method comprises localizing the mobile device, using the processor and the memory, along a sequence of positions describing a route being traversed in an indoor facility based on a set of data fusion inputs, detecting, based on magnetic field data of a magnetic field sensor device coupled to the processor, one or more outlier magnetic parameters in accordance with at least one magnetic parameter threshold, and upon establishing existence of a magnetic distortion field based upon the one or more outlier magnetic parameters, switching to a mobile device transition localization mode.

Also provided is a mobile device including a processor and a memory storing a set of computer instructions. The instructions are executable in the processor to localize the mobile device, using the processor and the memory, along a sequence of positions describing a route being traversed in an indoor facility based on a set of data fusion inputs, detect, based on magnetic field data of a magnetic field sensor device coupled to the processor, one or more outlier magnetic parameters in accordance with at least one magnetic parameter threshold, and upon establishing existence of a magnetic distortion field based upon the one or more outlier magnetic parameters, switch to a mobile device transition localization mode.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

A mobile device as described herein may be implemented, in whole or in part, on mobile computing devices such as cellular or smartphones, laptop computers, wearable computer devices, and tablet devices. Memory, processing, and network resources may all be used in connection with the use and performance of embodiments described herein, including with the performance of any method or with the implementation of any system.

Furthermore, one or more embodiments described herein may be implemented through the use of logic instructions that are executable by one or more processors. These instructions may be carried on a computer-readable medium. In particular, machines shown with embodiments herein include processor(s) and various forms of memory for storing data and instructions. Examples of computer-readable mediums and computer storage mediums include portable memory storage units, and flash memory (such as carried on smartphones). A mobile device as described herein utilizes processors, memory, and logic instructions stored on computer-readable medium. Embodiments described herein may be implemented in the form of computer processor-executable logic instructions or programs stored on non-transitory computer memory mediums.

System Description

FIG. 1 illustrates, in an example embodiment, a system 100 for localizing a mobile device 101 in a magnetic field. Mobile device 101 may be such as a cellular or smartphone, a laptop or a tablet computer, or a wearable computer device that is operational for any one or more of telephony, messaging, and data computing. Mobile device 101 may be connected within a computer network system, including the internet or other wide area network, to one or more remote server computing devices 108. Mobile device 101 may include magnetic distortion logic module 105, the latter embodied according to computer processor-executable instructions stored within a memory of, or otherwise accessible to a processor of, mobile device 101. In alternate embodiments, it is contemplated that one or more portions of magnetic distortion logic module 105 may be stored at the remote server computing device 108, while being communicatively accessible to mobile device 101 via communication network 106.

A navigation, or positioning, software application downloaded and installed, or stored, in a memory of mobile device 101 may render physical layout map 102 related to a facility or building within a user interface display of mobile device 101. In one embodiment, the navigation software application may incorporate magnetic distortion logic module 105. The terms indoor facility or building as used herein means an at least partially enclosed building having at least one fixed boundary, such as an exterior boundary wall. Display of physical layout map 102 may further show trajectory or route 103 constituted of a sequence of spatial positions traversed by the mobile device, which may include an estimated trajectory segment predicted for traversal by mobile device 101. Physical layout map 102 may further depict one or more map constraint features 104, such as an internal wall or other map constraint feature including a doorway, a facility exit, a physical marker fixed in place, a facility entrance, a stairwell, a stairway, a corridor, an elevator, and an external boundary outline of the indoor facility.

Positioning fingerprint data repository 107, hosted at a server computing device 108 in one embodiment, may be communicatively accessible to mobile device 101, via communication network 106. In alternate embodiments, positioning fingerprint data repository 107, or any portion(s) thereof, may be stored in a memory of mobile device 101. The terms fingerprint and fingerprint data as used herein refer to time-correlated or time-stamped, individual measurements of any of, or any combination of, received wireless communication signal strength and signal connectivity parameters, magnetic field measurements and barometric pressure measurements, and mobile device inertial sensor data at known, particular locations within an area being traversed, or anticipated for traversal, by the mobile device. In other words, a fingerprint includes a correlation of sensor and signal information including, but not necessarily limited to wireless signal strength, magnetic and barometric data, and inertial sensor information time-correlated for respective positions or coordinate locations within the area or facility being traversed. For instance, barometric fingerprint data associated with contiguous locations or positions may establish a pattern or signature that uniquely correlates to that particular sequence of locations or positions.

Once a particular as-measured value, a pattern or signature based on any one or more of received wireless communication signal strength and signal connectivity parameters, magnetic field parameters or barometric pressure parameters, and mobile device inertial sensor data is detected or recorded by mobile device 101, the value or pattern as detected may be matched to a reference fingerprint stored in a fingerprint map of a given facility, for example as stored in positioning fingerprint data repository 107, to identify the unique position of the mobile device relative to the facility, a process also referred to herein as localization. A sequence of positions or locations that constitute a navigation path traversed by mobile device 101 relative to the indoor facility may be mapped for fingerprint data during a fingerprint calibration process. In some embodiments, given that sampling times and sampling rates applied in conjunction with particular mobile device sensors may be different, the signal and sensor information as measured during a fingerprint calibration process may be time-averaged across particular periods of time, with the time-averaged value being used to represent the signal information at any given instance of time within that particular period of time in which the signal information is time-averaged. Fingerprint data may be used to track mobile device 101 traversal along route 103 within, and even adjoining, the indoor facility.

The mobile device wireless signal data including signal strength and connectivity, inertial data, barometric data, magnetic data and other coordinate data may be gathered at positions along a trajectory of motion and used as input parameters for joint fusion with fingerprint location data. In some embodiments, the joint fusion, also referred to as data fusion herein, can be performed using a Bayesian filter, a Kalman filter, a Rodriguez filter, or any suitable method of jointly fusing input data to determine, or estimate, a coordinate position of the mobile device, also referred to herein as localizing the mobile device, based on the data fusion. The mobile device position or location may be expressed in accordance with either a local or global (X, Y, Z) coordinate system.

Estimating a trajectory of the mobile device in accordance with the data fusion may be based on the wireless signal data, inertial data, barometric data, magnetic data and other device data may include such as, but not limited to, instantaneous inertial sensor measurements including directional heading and step length, short-term inertial sensor measurement history within a specified time window, Wi-Fi received signal strength and connectivity measurements, Bluetooth received signal strength measurements, barometric-based pressure data, magnetic field data including field strength and direction, floor layout map physical constraints such as doors, walls and entryways, environment landmarks, cellular communication signal strengths and GPS signal data.

Figure 2:
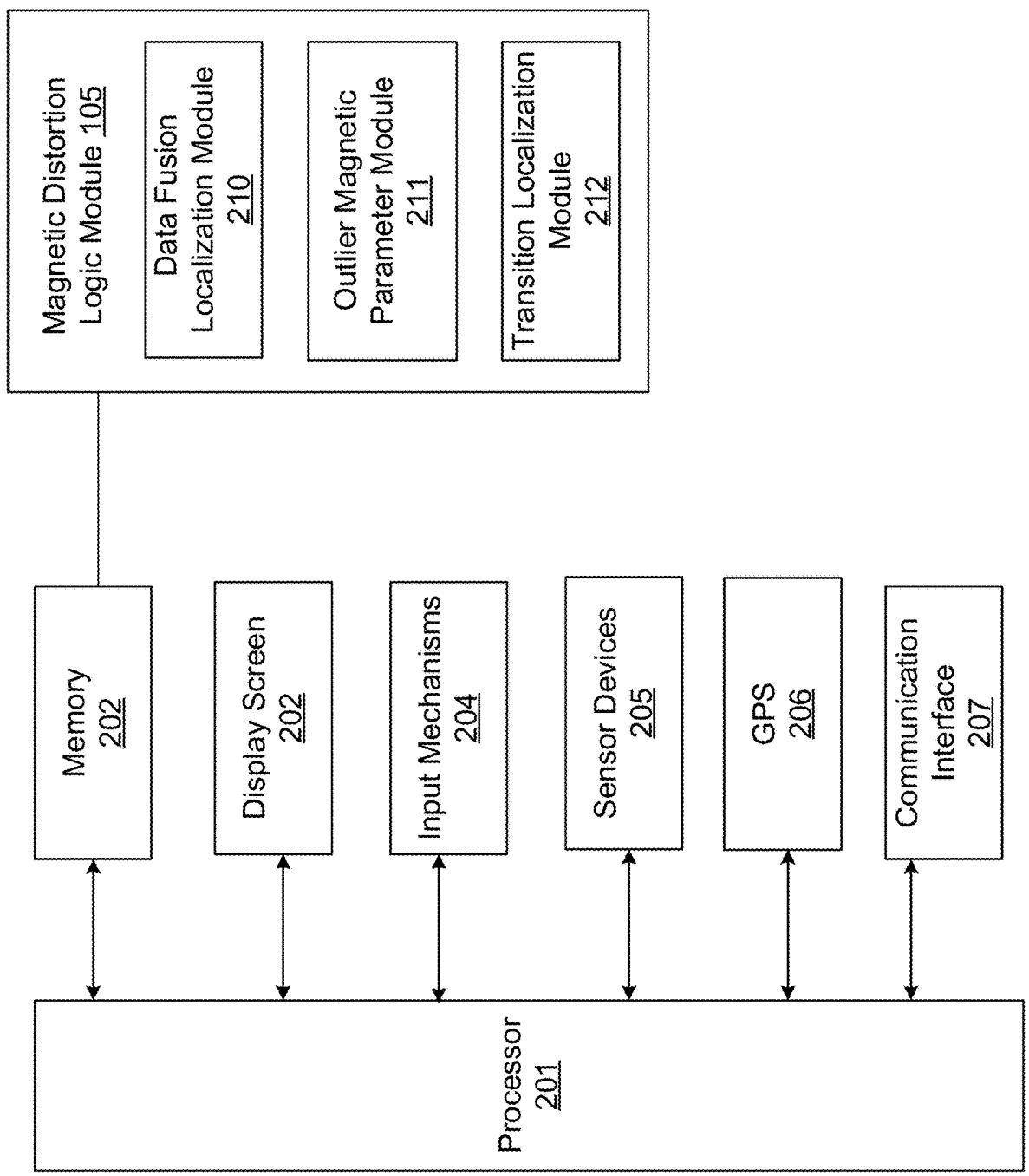
FIG. 2 illustrates, in one example embodiment, an architecture of a mobile device to detect a distorted magnetic field.

FIG. 2 illustrates an architecture of mobile device 101 for localization in a magnetic field, in one embodiment. Mobile device 101 may include processor 201, memory 202, display screen 203, input mechanisms 204 such as a keyboard or software-implemented touchscreen input functionality, barcode, QR code or other symbol- or code-scanner input functionality. Mobile device 101 may include sensor functionality by way of sensor devices 205. Sensor devices 205 may include inertial sensors such as an accelerometer and a gyroscope, magnetometer or other magnetic field sensing functionality, barometric or other ambient pressure sensing functionality, and ambient lighting sensors, such as to detect ambient lighting intensity.

Mobile device 101 may also include capability for detecting and communicatively accessing ambient wireless communication signals including but not limited to any of Bluetooth and Bluetooth Low Energy (BLE), Wi-Fi, RFID, and also satellite-based navigations signals including global positioning system (GPS) signals. Mobile device 101 further includes the capability for detecting, via sensor devices 205, and measuring a received signal strength, and of determining signal connectivity parameters, related to the ambient wireless signals. In particular, mobile device 101 may include location determination capability such as by way of GPS module 206 having a GPS receiver, and communication interface 207 for communicatively coupling to communication network 106, including by sending and receiving cellular data over data and voice channels.

Magnetic distortion logic module 105 includes instructions stored in memory 202 of mobile device 101. In embodiments, magnetic distortion logic module 105 may be included in a mobile device navigation application program stored in memory 202 of mobile device 101. The term indoor location as used herein refers to a location within the facility or building, such as within a shopping mall, an airport, a warehouse, a university campus, or any at least partially enclosed building. Magnetic distortion logic module 105 may comprise sub-modules including data fusion localization module 210, outlier magnetic parameter module 211 and transition localization module 212.

Processor 201 uses executable instructions stored in data fusion localization module 210 to localize the mobile device 101 along a sequence of positions describing a route being traversed in an indoor facility based on a set of data fusion inputs. Processor 201 executes instructions included in data fusion localization module 210, to localize, using the processor and the memory, the mobile device along a sequence of positions describing a route being traversed in an indoor facility based on a set of data fusion inputs. The positions or locations may be expressed in accordance with either a local or global (X, Y, Z) coordinate system.

In embodiments, the fingerprint map data stored in fingerprint data repository 107 (also referred to herein as repository 107) further associates respective positions along route 103 within the area or facility with a unique combination of fingerprint data, including gyroscope data, accelerometer data, wireless signal strength data, wireless connectivity data, barometric data, acoustic data, line-of sight data, ambient lighting data, and magnetic data.

The set of data fusion inputs may include wireless signal data and inertial sensor data, and also barometric data, magnetic data and map feature data of the indoor facility. The map feature data may be layout map data pertaining to physical details and constraints such as walls, corridors, landmarks, doorways and stairs or elevators within the building or indoor facility. The localizing may be performed in conjunction with accessing a fingerprint data repository 107 associated with the indoor facility. Data repository 107 may be hosted at remote server 108, or at portions thereof may be downloaded into local memory 202 of mobile device 101.

In one embodiment, the wireless signal data comprises at least one of Wi-Fi signal data, Bluetooth signal data, cellular communication data and Global Positioning System (GPS) data.

In another embodiment, the inertial sensor data may be acquired at mobile device 101 using one or more of gyroscope and an accelerometer of the mobile device 101. Magnetic data may also be gathered using a magnetometer at mobile device 101, providing magnetic data based on measurements such as magnetic field strength, direction, and magnetic dip angle.

Processor 201 uses executable instructions stored in outlier magnetic parameter module 211 to detect, based on magnetic field data of a magnetic field sensor device coupled to the processor of the mobile device, one or more outlier magnetic parameters in accordance with at least one magnetic parameter threshold.

Processor 201 uses executable instructions stored in transition localization module 212 to, upon establishing existence of a magnetic distortion field based upon the one or more outlier magnetic parameters, switch to a mobile device transition localization mode In one embodiment, based on detecting a transition out of the distortive magnetic field in accordance with localizing the mobile device using the subset of data fusion inputs and the map feature data, the method may then revert to localizing the mobile device based on the full, or original, set of data fusion inputs.

In embodiments, the fingerprint map data, including the map feature data, stored in fingerprint data repository 107 (also referred to herein as repository 107) further associates respective positions along route 103 within the area or facility with a unique combination of fingerprint data, including gyroscope data, accelerometer data, wireless signal strength data, wireless connectivity data, barometric data, acoustic data, line-of sight data, ambient lighting data, and magnetic data.

In an embodiment, a modification of subset of data fusion inputs minimizes a weighting of the magnetic field data in the data fusion process for localizing the mobile device 101, as measurements acquired using those sensors may no longer be accurate while within the ambit or influence of a distortive magnetic field, relative to the inertial data, barometric data, magnetic data and other sensor data inputs to the data fusion process in localizing mobile device 101. In one variation, the weighting accorded to the inertial sensor data and the wireless signal data may be increased, at the expense of the magnetic field data weighting in the data fusion process.

In embodiments, the data of repository 107 may be accessible in memory 202 of mobile device 101, and also accessible from a server computing device 108 via wireless communication network 106.

In embodiments, the fingerprint map data stored in conjunction with map feature data of the indoor facility at fingerprint data repository 107 (also referred to herein as repository 107) further associates respective positions along route 103 within the area or facility with a unique combination of fingerprint data, including gyroscope data, accelerometer data, wireless signal strength data, wireless connectivity data, barometric data, acoustic data, line-of sight data, ambient lighting data, and magnetic data. The map feature data may include known physical features within the indoor facility which may potentially distort a magnetic field, such as but not limited to steel elevators, or large steel structures, and radio frequency identification (RFID) equipment. In one embodiment, the map feature data may indicate or represent the existence of a potentially distortive magnetic field by designating a geofenced portion of the indoor facility as susceptible to such distortions.

The set of data fusion inputs may be based on any of wireless signal data, inertial sensor data, barometric data, magnetic data, optical line of sight data and map feature data of the indoor facility. The map feature data may incorporate layout map data pertaining to physical details and constraints such as walls, corridors, landmarks, doorways and stairs or elevators within the building or indoor facility relative to the potentially magnetic field distorting features. The localizing may be performed in conjunction with accessing a fingerprint data repository 107 associated with the indoor facility. Data repository 107 may be hosted at remote server 108, or at portions thereof may be downloaded into local memory 202 of mobile device 101.

In one embodiment, the wireless signal data comprises at least one of Wi-Fi signal data, Bluetooth signal data, cellular communication data and Global Positioning System (GPS) data.

In another embodiment, the inertial sensor data may be acquired at mobile device 101 using one or more of gyroscope and an accelerometer of the mobile device 101. Magnetic data may also be gathered using a magnetometer at mobile device 101, providing magnetic data based on measurements such as magnetic field strength, direction, and magnetic dip angle.

In embodiments, the fingerprint data of repository 107 may be accessible in memory 202 of mobile device 101, and also accessible from a server computing device 108 via wireless communication network 106 in conjunction with communication interface 207.

Methodology

FIG. 3 illustrates, in an example embodiment, a method 300 of localizing a mobile device 101 in a magnetic field. In describing examples of FIG. 3, reference is made to the examples of FIGS. 1-2 for purposes of illustrating suitable components or elements for performing a step or sub-step being described.

Examples of method steps described herein relate to the use of mobile device 101 for implementing the techniques described. According to one embodiment, the techniques are performed by magnetic distortion logic module 105 of mobile device 101 in response to the processor 201 executing one or more sequences of software logic instructions that constitute magnetic distortion logic module 105. In embodiments, magnetic distortion logic module 105 may include the one or more sequences of instructions within sub-modules including data fusion localization module 210, outlier magnetic parameter module 211 and transition localization module 212. Such instructions may be read into memory 202 from machine-readable medium, such as memory storage devices. In executing the sequences of instructions contained in data fusion localization module 210, outlier magnetic parameter module 211 and transition localization module 212 of magnetic distortion logic module 105 in memory 202, processor 201 performs the process steps described herein. In alternative implementations, at least some hard-wired circuitry may be used in place of, or in combination with, the software logic instructions to implement examples described herein. Thus, the examples described herein are not limited to any particular combination of hardware circuitry and software instructions. Additionally, it is contemplated that in alternative embodiments, the techniques herein, or portions thereof, may be distributed between the mobile device 101 and a remote server computing device 108. For example, the mobile device may collect and transmit data to the server 108 that, in turn, performs at least some portion of the techniques described herein.

At step 410, processor 201 executes instructions included in data fusion localization module 210, to localize mobile device 101, using the processor and the memory, along a sequence of positions describing a route being traversed in an indoor facility based on a set of data fusion inputs. The positions or locations may be expressed in accordance with either a local or global (X, Y, Z) coordinate system.

In embodiments, the fingerprint map data stored in conjunction with map feature data of the indoor facility at fingerprint data repository 107 (also referred to herein as repository 107) further associates respective positions along route 103 within the area or facility with a unique combination of fingerprint data, including gyroscope data, accelerometer data, wireless signal strength data, wireless connectivity data, barometric data, acoustic data, line-of sight data, ambient lighting data, and magnetic data. The map feature data may include known physical features within the indoor facility which may potentially distort a magnetic field, such as but not limited to steel elevators, or large steel structures, and radio frequency identification (RFID) equipment.

The set of data fusion inputs may be based on any of wireless signal data, inertial sensor data, barometric data, magnetic data, optical line of sight data and map feature data of the indoor facility. The map feature data may incorporate layout map data pertaining to physical details and constraints such as walls, corridors, landmarks, doorways and stairs or elevators within the building or indoor facility relative to the potentially magnetic field distorting features. The localizing may be performed in conjunction with accessing a fingerprint data repository 107 associated with the indoor facility. Data repository 107 may be hosted at remote server 108, or at portions thereof may be downloaded into local memory 202 of mobile device 101.

In one embodiment, the wireless signal data comprises at least one of Wi-Fi signal data, Bluetooth signal data, cellular communication data and Global Positioning System (GPS) data.

In another embodiment, the inertial sensor data may be acquired at mobile device 101 using one or more of gyroscope and an accelerometer of the mobile device 101. Magnetic data may also be gathered using a magnetometer at mobile device 101, providing magnetic data based on measurements such as magnetic field strength, direction, and magnetic dip angle.

At step 420, processor 201 executes instructions included in outlier magnetic parameter module 211 to detect, based on magnetic field data of a magnetic field sensor device coupled to the processor 201 of the mobile device 101, one or more outlier magnetic parameters in accordance with at least one magnetic parameter threshold. The magnetic field sensor device may be a magnetometer, coupled to the processor 201 of the mobile device 101, in an embodiment. The magnetic field data may include measurements of magnetic field parameters including magnetic field strength measurement values, a magnetic field orientation or direction, and a magnetic dip angle.

One or more magnetic parameters of the magnetic field data may be established as outlier magnetic parameters upon a predetermined threshold being exceeded or violated. The threshold may be based on either an absolute value of the magnetic parameters as measured, or on a rate of change of the magnetic parameters mobile device 101 advances along the sequence of positions being traversed. In one variation, the threshold may be adapted as requiring both an absolute value of the magnetic parameters as measured and a rate of change. In one embodiment, the threshold may be established as a 50% or more change in a measured absolute value over a short period of time, for example, 10 seconds or less, although it is contemplated other time periods may be applied. With regard to a rate of change of a magnetic parameter, in one embodiment when a rate of change of the magnetic field strength value exceeds 40%, the threshold is exceeded, and existence of a magnetic distortion field is presumed. The threshold value for either absolute value or a rate of change value may be predetermined or adjusted dynamically based on a moving average value calculated from the most recent magnetic parameter values measured as the mobile device advances along the sequence of positions. In one embodiment, the most recent magnetic field data based on the most recent twenty or thirty positions as localized may be used, but other position ranges may be used to calculate the moving average upon which the threshold is based.

At step 430, processor 201 executes further instructions included in transition localization module 212 to, upon establishing existence of a magnetic distortion field based upon the one or more outlier magnetic parameters, switch to a transition localization mode of mobile device 101.

In an embodiment, the transition localization mode comprises modifying the subset of data fusion inputs by minimizing a weighting of the magnetic field data in the data fusion process in localizing the mobile device 101, as measurements acquired using those sensors may no longer be accurate while within the ambit or influence of a distortive magnetic field, relative to the inertial data, barometric data, magnetic data and other sensor data inputs to the data fusion process in localizing mobile device 101. In another variation, the weighting accorded to the inertial sensor data and the wireless signal data may be increased at the expense of the weighting of the magnetic field data in the data fusion process.

In an embodiment, in the transition localization mode, a sampling rate of acquisition of the magnetic field data by the magnetic field sensor device is increased, for example by a factor of 2 as compared with localization of mobile device 101 using the full set of data fusion inputs before the magnetic distortion field was detected.

In one embodiment, based on detecting a transition out of the ambit of the distortive magnetic field in accordance with outlier magnetic parameters being measured as now changed to be within the predetermined thresholds, the method may then revert to localizing the mobile device based on the full, or original, set of data fusion inputs, as the magnetic field data may now be re-established as trustworthy and accurate.

In embodiments, the fingerprint map data, including the map feature data, stored in fingerprint data repository 107 (also referred to herein as repository 107) further associates respective positions along route 103 within the area or facility with a unique combination of fingerprint data, including gyroscope data, accelerometer data, wireless signal strength data, wireless connectivity data, barometric data, acoustic data, line-of sight data, ambient lighting data, and magnetic data.

In an embodiment, the subset of data fusion inputs excludes the magnetic field data, such as by deactivating the magnetic field sensor(s) of mobile device 101, as measurements acquired using those sensors may no longer be accurate while within the ambit or influence of a distortive magnetic field, relative to the inertial data, barometric data, magnetic data and other sensor data inputs to the data fusion process in localizing mobile device 101.

In embodiments, the data of repository 107 may be accessible in memory 202 of mobile device 101, and also accessible from a server computing device 108 via wireless communication network 106.

It is contemplated for embodiments described herein to extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mention of the particular feature. Thus, the absence of describing combinations should not preclude the inventor from claiming rights to such combinations.

What is claimed is:

1. A method for localizing a mobile device having a processor and a memory, the method comprising:
   localizing the mobile device, using the processor and the memory, along a sequence of positions describing a route being traversed in an indoor facility based on a set of data fusion inputs;
   detecting, based on magnetic field data of a magnetic field sensor device coupled to the processor, one or more outlier magnetic parameters in accordance with at least one magnetic parameter threshold; and
   upon establishing existence of a magnetic distortion field based upon the one or more outlier magnetic parameters, switching to a mobile device transition localization mode, a sampling rate of acquisition of the magnetic field data by the magnetic field sensor device being increased while in the transition localization mode.

2. The method of claim 1 wherein the set of data fusion inputs includes wireless signal data, inertial sensor data, and the magnetic field data of the magnetic field sensor.

3. The method of claim 2 wherein the magnetic field data comprises a magnetic field strength, a magnetic field direction, and magnetic dip angle.

4. The method of claim 3 wherein the one or more magnetic outlier parameters comprises one or more of the magnetic field strength, a magnetic field direction, and magnetic dip angle that exceeds a respective predetermined threshold value.

5. The method of claim 4 wherein the respective threshold value is based on at least one of an absolute value and a rate of change of the magnetic field data relative to a moving average of a set of preceding measurements of the magnetic field data.

6. The method of claim 1 wherein the magnetic field sensor device comprises a magnetometer.

7. The method of claim 1 where the transition localization mode comprises a modification of the magnetic field data to the set of data fusion inputs during the existence of the distorted magnetic field.

8. The method of claim 7 wherein the modification comprises according to the magnetic data a reduced weighting while according to at least one of the inertial sensor data and the wireless signal data an increased weighting in localizing the mobile device based on the set of data fusion inputs.

9. The method of claim 1 further comprising reverting to localizing the mobile device based on the set of data fusion inputs upon detecting a transition out of the distortive magnetic field in accordance with at least one of the magnetic outlier parameters.

10. A mobile device comprising:
    a processor; and
    a memory storing a set of instructions, the instructions executable in the processor to:
       localize the mobile device, using the processor and the memory, along a sequence of positions describing a route being traversed in an indoor facility based on a set of data fusion inputs;

detect, based on magnetic field data of a magnetic field sensor device coupled to the processor, one or more outlier magnetic parameters in accordance with at least one magnetic parameter threshold; and upon establishing existence of a magnetic distortion field based upon the one or more outlier magnetic parameters, switch to a mobile device transition localization mode, a sampling rate of acquisition of the magnetic field data by the magnetic field sensor device being increased while in the transition localization mode.

11. The method of claim 10 wherein the set of data fusion inputs includes wireless signal data, inertial sensor data, and the magnetic field data of the magnetic field sensor.

12. The method of claim 10 wherein the magnetic field data comprises a magnetic field strength, a magnetic field direction, and magnetic dip angle.

13. The method of claim 12 wherein the one or more magnetic outlier parameters comprises one or more of the magnetic field strength, a magnetic field direction, and magnetic dip angle that exceeds a respective predetermined threshold value.

14. The method of claim 13 wherein the respective threshold value is based on at least one of an absolute value and a rate of change of the magnetic field data relative to a moving average of a set of preceding measurements of the magnetic field data.

15. The method of claim 10 wherein the magnetic sensor device comprises a magnetometer of the mobile device.

16. The method of claim 10 where the transition localization mode comprises a modification of the magnetic field data to the set of data fusion inputs during the existence of the distorted magnetic field.

17. The method of claim 16 wherein the modification comprises according to the magnetic data a reduced weighting while according to at least one of the inertial sensor data and the received signal strength data an increased weighting in localizing the mobile device based on the set of data fusion inputs.

18. The method of claim 1 further comprising reverting to localizing the mobile device based on the set of data fusion inputs upon detecting a transition out of the distortive magnetic field in accordance with at least one of the magnetic outlier parameters.

* * * * *